(12) United States Patent
Tamboise et al.

(10) Patent No.: US 7,684,354 B2
(45) Date of Patent: Mar. 23, 2010

(54) METHOD AND SYSTEM FOR ANALYZING THE TOPOLOGY OF A MULTIPROTOCOL LABEL SWITCHING (MPLS)/VIRTUAL PRIVATE NETWORK (VPN) NETWORK

(75) Inventors: Guillaume Tamboise, Oslo (NO); Frederik Cazenave, Amiens (FR)

(73) Assignee: Schlumberger Technology Corporation, Houston, TX (US)

( * ) Notice: Subject to any disclaimer, the term of this patent is extended or adjusted under 35 U.S.C. 154(b) by 215 days.

(21) Appl. No.: 11/832,510

(22) Filed: Aug. 1, 2007

(65) Prior Publication Data

US 2008/0031157 A1 Feb. 7, 2008
US 2008/0186874 A2 Aug. 7, 2008

Related U.S. Application Data

(60) Provisional application No. 60/835,611, filed on Aug. 4, 2006.

(51) Int. Cl.
H04L 12/28 (2006.01)
(52) U.S. Cl. .................. 370/255; 370/241; 370/242; 370/244; 370/245; 370/248; 370/250; 370/254
(58) Field of Classification Search ......... 370/241–245, 370/248, 250, 254–258
See application file for complete search history.

(56) References Cited

U.S. PATENT DOCUMENTS

| | | | | |
|---|---|---|---|---|
| 5,093,824 | A | * | 3/1992 | Coan et al. .................. 370/228 |
| 7,324,453 | B2 | * | 1/2008 | Wu et al. .................... 370/238 |
| 2003/0026268 | A1 | * | 2/2003 | Navas ........................ 370/400 |

FOREIGN PATENT DOCUMENTS

| | | |
|---|---|---|
| EP | 1 587 240 | 10/2005 |
| WO | 2004/004217 A1 | 1/2004 |

OTHER PUBLICATIONS

International Search Report and Written Opinion dated Dec. 3, 2007 (14 pages).
Nadeau, T. et al.; "MPLS/BGP Layer 3 Virtual Private Network (VPN) Management Information Base; rfc4382.txt"; IETF Standard, Internet Engineering Task Force, IETF, CH, Feb. 6, 2006 (44 pages).

(Continued)

Primary Examiner—William Trost, IV
Assistant Examiner—Ashil Farahmand
(74) Attorney, Agent, or Firm—Osha Liang LLP (57) ABSTRACT

In general, embodiments of the invention relates to a method for analyzing a topology of a multiprotocol label switching (MPLS)/Virtual Private Network (VPN) network. The method includes obtaining logical communication channel information for a plurality of virtual routing and forwarding (VRF) instances, wherein each of the plurality of VRF instances are located on one of a plurality of routers, wherein the logical communication channel information specifies a plurality of logical communication channels between the plurality of VRF instances, and wherein at least two VRF instances are located on one of the plurality of routers. The method further includes constructing an audit matrix representing the logical communication channel information, wherein the audit matrix specifies the topology of the MPLS/VPN network, analyzing the audit matrix to obtain an analysis result, and presenting the analysis result.

13 Claims, 6 Drawing Sheets

OTHER PUBLICATIONS

Rose, E et al: "BGP/MPLS IP Virtual private Networks (VPNs); rfc4364.txt"; IETF Standard, Internet Engineering Task Force, IETF, CH, Feb. 2006 (47 pages).

Keohane, M.; "Policing the Infrastructure"; Fourth Quarter 2004, vol. 16, No. 4, Services At Wire Speed: Cisco Systems Users Magazine (5 pages).

"MPLS-VPN (RFC2457): Scaling and Features"; CiscoIOS Software; Cisco Systems Inc., 2002, pp. 1-105.

Awerbuch, B. et al.; "Low-Diameter Graph Decomposition is in NC"; Scandinavian Workshop on Algorithm Theory, 1992, pp. 1-12.

Mannie, E.; "Generalized Multi-Protocol Label Switching (GMPLS) Architecture"; Network Working Group Request for Comments: 3945, Oct. 2004, pp. 1-69.

* cited by examiner

METHOD AND SYSTEM FOR ANALYZING THE TOPOLOGY OF A MULTIPROTOCOL LABEL SWITCHING (MPLS)/VIRTUAL PRIVATE NETWORK (VPN) NETWORK

CROSS-REFERENCE TO RELATED APPLICATIONS

This application claims benefit of U.S. Provisional Application Ser. No. 60/835,611 entitled "Method and System for Analyzing the Topology of a Multiprotocol Label Switching (MPLS)/Virtual Private Network (VPN) Network," filed on Aug. 4, 2006, in the name of Guillaume Tamboise and is hereby incorporated by reference.

BACKGROUND

A network corresponds to an interconnection of two or more computer systems. For example, one type of network is a home network. A home network may include two or more personal computers that can exchange data with each other and the Internet. Different types of networks exist throughout society. For example, large organizations often have data centers, servers, and various personal computer systems to exchange information between users, and to provide processing power to a single user.

Each large organization may have one or more locations. The locations may be interconnected using, for example, a virtual private network (VPN). A VPN is a secure tunnel over a shared network (e.g., the Internet) into a private network.

One method for implementing a VPN is using a multiprotocol label switching (MPLS) network (MPLS/VPN network). In an MPLS network, customer edges, belonging to an organization or business for which the VPN is provided, transfer frames within the VPN. Typically, a customer edge is only aware of the single VPN. In order to transfer frames, each customer edge is connected to a VRF instance on a provider edge router. The provider edge routers are configured to attach and remove labels as required to route the frame.

Typically, a frame is transferred with an inner label and an outer label. The inner label is assigned by an ingress provider edge router to identify a VRF instance on an egress provider edge router. The ingress provider edge router is the incoming router that receives the frame into the MPLS/VPN network. The egress provider edge router is the last MPLS router that the packet traverses before exiting the MPLS network. Thus, the ingress provider edge router has the VRF instance connected to the customer edge that sends the frame. The egress provider edge router is the router that has the VRF instance connected to the customer edge that receives the frame. The inner label typically does not change as the frame traverses the MPLS/VPN network.

In contrast, the outer label is used to let any MPLS router (e.g., provider router or provider edge router) know the next MPLS router that should be sent the frame. The outer label may be changed at each hop through the MPLS network.

In order to ensure the security of the VPN, MPLS requires each provider edge router to have a separate Virtual Routing and Forwarding (VRF) instance for each VPN that uses the provider edge router. The VRF instance identifies which label should be added to the frame based on the destination of the frame. Because the VRF instances are established on a per VPN basis, frames received by the VRF instance will typically have a label that is unique for the VPN on the provider edge router. Once the proper label is identified using the VRF instance, the label is attached to the frame and the frame is forwarded as discussed above.

In certain cases, two customer edges in different VPNs may require communication. In such cases, communication may be allowed by specifying in the VRF instances for both customer edges that communication may be sent to and received from the other VRF instance. When communication is allowed between two VRF instances, regardless of whether the VRF instances are in the same VPN, a logical communication channel is considered to exist between the two VRF instances. The collection of logical communication channels forms a network topology.

SUMMARY

In general, in one aspect, the invention relates to a method for analyzing a topology of a multiprotocol label switching (MPLS)/Virtual Private Network (VPN) network. The method includes obtaining logical communication channel information for a plurality of virtual routing and forwarding (VRF) instances, wherein each of the plurality of VRF instances are located on one of a plurality of routers, wherein the logical communication channel information specifies a plurality of logical communication channels between the plurality of VRF instances, and wherein at least two VRF instances are located on one of the plurality of routers. The method further includes constructing an audit matrix representing the logical communication channel information, wherein the audit matrix specifies the topology of the MPLS/VPN network, analyzing the audit matrix to obtain an analysis result, and presenting the analysis result.

In general, in one aspect, the invention relates to a system for analyzing a topology of a multiprotocol label switching (MPLS)/Virtual Private Network (VPN) network. The system includes a plurality of routers comprising logical channel information and a framework. The framework in configured to obtain the logical channel information for a plurality of virtual routing and forwarding (VRF) instances on the plurality of routers, wherein the logical channel information specifies a plurality of logical communication channels between the plurality of VRF instances, and wherein at least two VRF instances are located on the same router. The framework is further configured to construct an audit matrix representing the logical channel information, wherein the audit matrix specifies the topology of the MPLS/VPN network, analyze the audit matrix to obtain an analysis result, and submit a modification to the logical channel information to modify at least one of the plurality of logical communication channels according to the analysis result.

In general, in one aspect, the invention relates to a computer usable medium comprising computer readable program code embodied therein for causing a computer system to obtain logical channel information for a plurality of virtual routing and forwarding (VRF) instances on a plurality of routers, wherein the logical channel information specifies a plurality of logical communication channels between the plurality of VRF instances, and wherein at least two VRF instances are located on the same router. The computer readable program code embodied therein further causes the computer system to construct an audit matrix representing the logical channel information, wherein the audit matrix specifies a topology of a MPLS/VPN network, analyze the audit matrix to obtain an analysis result, and submit a modification to the logical channel information to modify at least one of the plurality of logical communication channels according to the analysis result.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for analyzing the topology of a MPLS/VPN network. Specifically, embodiments of the invention provide a method and system for identifying the topology of the network by identifying the logical communication channels between the VRF instances in the MPLS/VPN network. In one or more embodiments of the invention, the logical communication channel information specifying logical communication channels for each VRF instance is obtained for each provider edge router in the MPLS/VPN network. Based on the logical communication channel information, an audit matrix may be created. By analyzing the audit matrix, the topology of the MPLS/VPN network, including the presence of the logical communication channels in MPLS/VPN network, may be determined.

Figure 1:
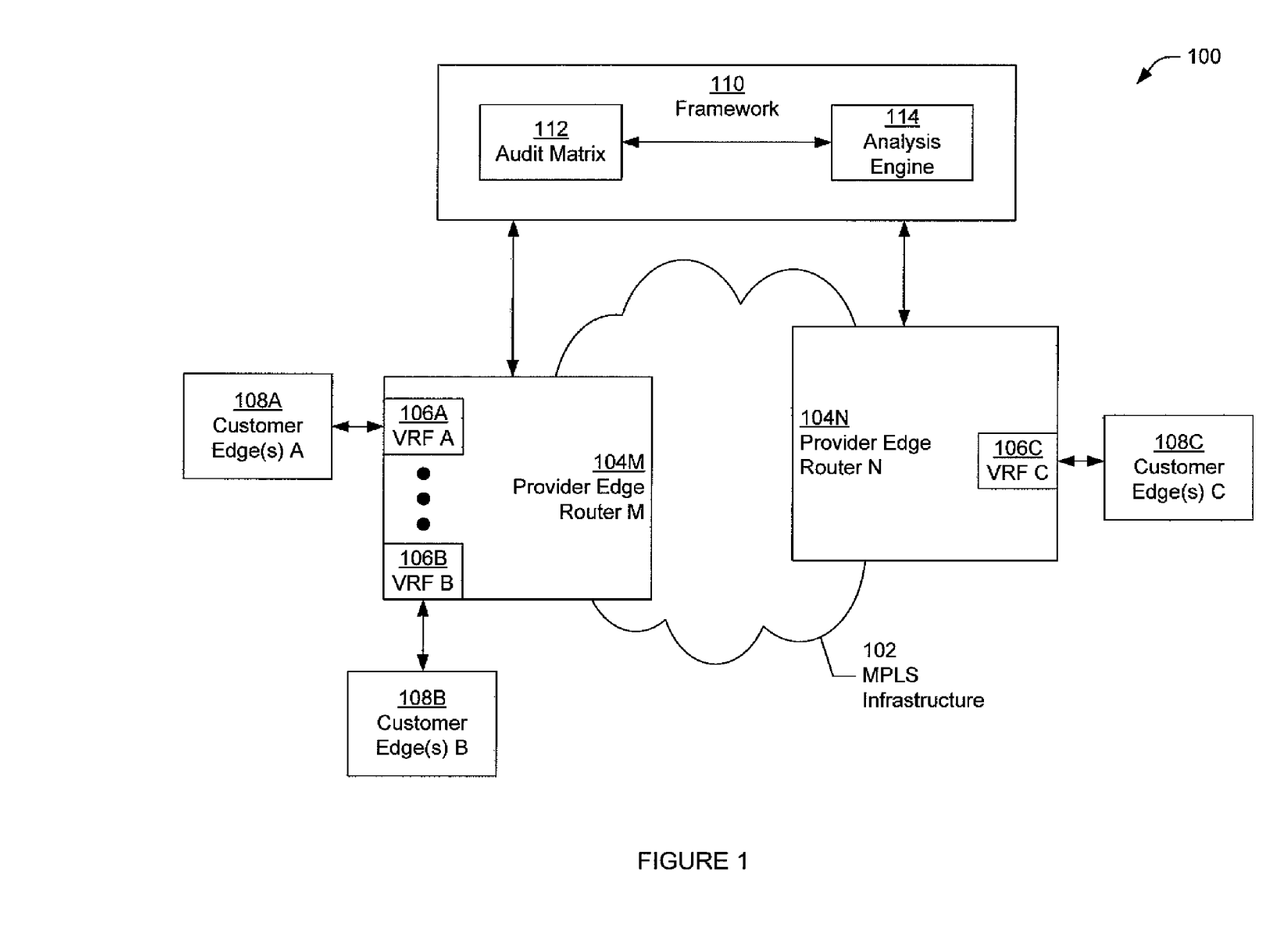
FIG. 1 shows a schematic diagram of a system in accordance with one or more embodiments of the invention.

FIG. 1 shows a schematic diagram of a system (100) in accordance with one or more embodiments of the invention. As shown in FIG. 1, the system (100) includes an MPLS infrastructure (102) and a framework (110) in accordance with one or more embodiments of the invention. The MPLS infrastructure (102) and framework (110) are discussed below.

In one or more embodiments of the invention, the MPLS infrastructure (102) is used to implement an MPLS/VPN network. As discussed above, the MPLS/VPN network is a network in which frames are communicated using labels. Specifically, the labels define how a frame is routed within the MPLS/VPN network. When a frame enters the MPLS/VPN network, an inner label is attached to the frame based on the destination address. The inner label defines a VRF instance (106A, 106B, 106C) (discussed below) on a provider edge router (104M, 104N) (discussed below) that receives the frame. As the frame is transferred through the series of routers of the MPLS/VPN network, an outer label may be viewed and updated to identify the next router to receive the frame. The MPLS infrastructure (102) may include provider edge routers (104M, 104N), provider routers (not shown), and customer edges (108) in accordance with one or more embodiments of the invention.

Typically, a customer edge (108A, 108B, 108C) is a localized network for an organization. For example, the customer edge (108A, 108B, 108C) may be the network for a specific geographic region and/or department of the organization. The customer edges (108A, 108B, 108C) that are allowed to communicate via the MPLS/VPN network form the VPN for the organization. Each customer edge (108A, 108B, 108C) includes functionality to send frames to and receive frames from a provider edge router (104M, 104N). Specifically, each customer edge (108A, 108B, 108C) is connected to a port (not shown) on a provider edge router (104M, 014N) in accordance with one or more embodiments of the invention.

Each port on the provider edge router (104M, 104N) may be associated with a VRF instance (106A, 106B, 106C). The VRF instance (106A, 106B, 106C) includes logical communication channel information. In one embodiment of the invention, the logical communication channel information defines, for the customer edge(s) (108A, 105B, 108C) connected to the VRF instance (106A, 106B, 106C), other VRF instances that the VRF instance (106A, 106B, 106C) may send frames to and/or receive frames from. When frames may be sent between two VRF instances, a logical communication channel (not shown) may be considered to exist between the two VRF instances. The logical communication channel may be uni-directional or bi-directional. Specifically, the logical communication channel is uni-directional when frames may be sent from a first VRF instance to a second VRF instance but not from the second VRF instance to the first VRF instance. In one embodiment of the invention, a logical communication channel is bi-directional when frames may be sent from the first VRF instance to a second VRF instance and from the second VRF instance to the first VRF instance.

In one embodiment of the invention, VRF instances (106A, 106B, 106C) on the same provider edge router (104M, 104N) may or may not have the same logical communication channels. For example, VRF A (106A) may have a logical communication channel with VRF C (106C) while VRF B (106B) does not have any communication channel with VRF C (106C). Specifically, customer edge(s) B (108B) is unable to communicate with customer edge(s) C (108C) while customer edge(s) A (108A) may communicate with customer edge(s) C (108C).

In one or more embodiments of the invention, logical communication channel information related to the VRF instances (106A, 106B, 106C) may be maintained in one or more configuration files (not shown) on the provider edge router (104M, 104N). In one embodiment of the invention, each VRF instance (106A, 106B, 106C) may be defined, with the configuration files, using a table, another data structure, or any combination thereof. Based on the VRF instance (106A, 106B, 106C), the provider edge router (104M, 104N) can identify the label to attach to a frame and the next router (e.g., provider router, provider edge router) to which to send the frame.

In one or more embodiments of the invention, the provider edge routers (104M, 104N) are connected to a framework (110). The framework (110) may be a centralized (or distributed) unit (e.g., computer system, program, etc.) that includes functionality to analyze the topology of the MPLS/VPN network. Specifically, the framework includes an analysis engine (114) and an audit matrix (112) to analyze the topology of the MPLS/VPN network.

In one embodiment of the invention, analysis engine (114) includes functionality to generate and analyze the audit matrix (112) (discussed below). Specifically, the analysis engine (114) includes functionality to identify the logical communication channels defined by the VRF instances (106)

and generate the audit matrix (112). Furthermore, the analysis engine (114) may include functionality to provide a display of the topology of the MPLS/VPN network and/or modify the VRF instances (106A, 106B, 106C) to modify the logical communication channels.

In one embodiment of the invention, the audit matrix (112) is a storage mechanism that specifies logical communication channels between VRF instances (106). In one or more embodiments of the invention, entries in the audit matrix (112) may be maintained in tabular format. Specifically, a single row of the audit matrix (112) may represent logical communication channel information for a single VRF instance in accordance with one or more embodiments of the invention. Similarly, a single column of the audit matrix (112) may represent logical communication channel information for a single VRF instance (106A, 106B, 106C) in accordance with one or more embodiments of the invention.

Thus, an entry in the audit matrix (112) identifies whether a uni-directional logical communication channel exists between two VRF instances. For example, entry (i, j) identifies whether there is a uni-directional logical communication channel between the VRF instance of row i and the VRF instance of row j.

Different data structures may be used to store the audit matrix without departing from the scope of the invention. The following is only a few examples of the possible data structures. In a first example, the audit matrix may be stored as a two-dimensional array that maintains the tabular format discussed above. In a second example, the audit matrix may be stored as a list for each VRF instance. Each entry in the list may specify the other VRF instances with which there is a uni-directional logical communication channel. In a third example, each entry in the list may represent that communication may not be received and/or sent from a particular VRF instance. In a fourth example, the audit matrix may be stored as a string of digits, where the position of the digit in the string identifies whether a uni-directional (or bi-directional) logical communication channel exist between two specific VRF instances.

Further, entries in the audit matrix may be a name of the VRF instance, a binary encoding (e.g., with zero representing no logical communication channel in a particular direction and one representing a uni-directional logical communication channel), an encoding scheme in which each entry may have three or four different possible values, or any other encoding. The above is a discussion of only a few of the different storage techniques for maintaining the audit matrix. Other techniques may also be used without departing from the scope of the invention.

Figure 2:
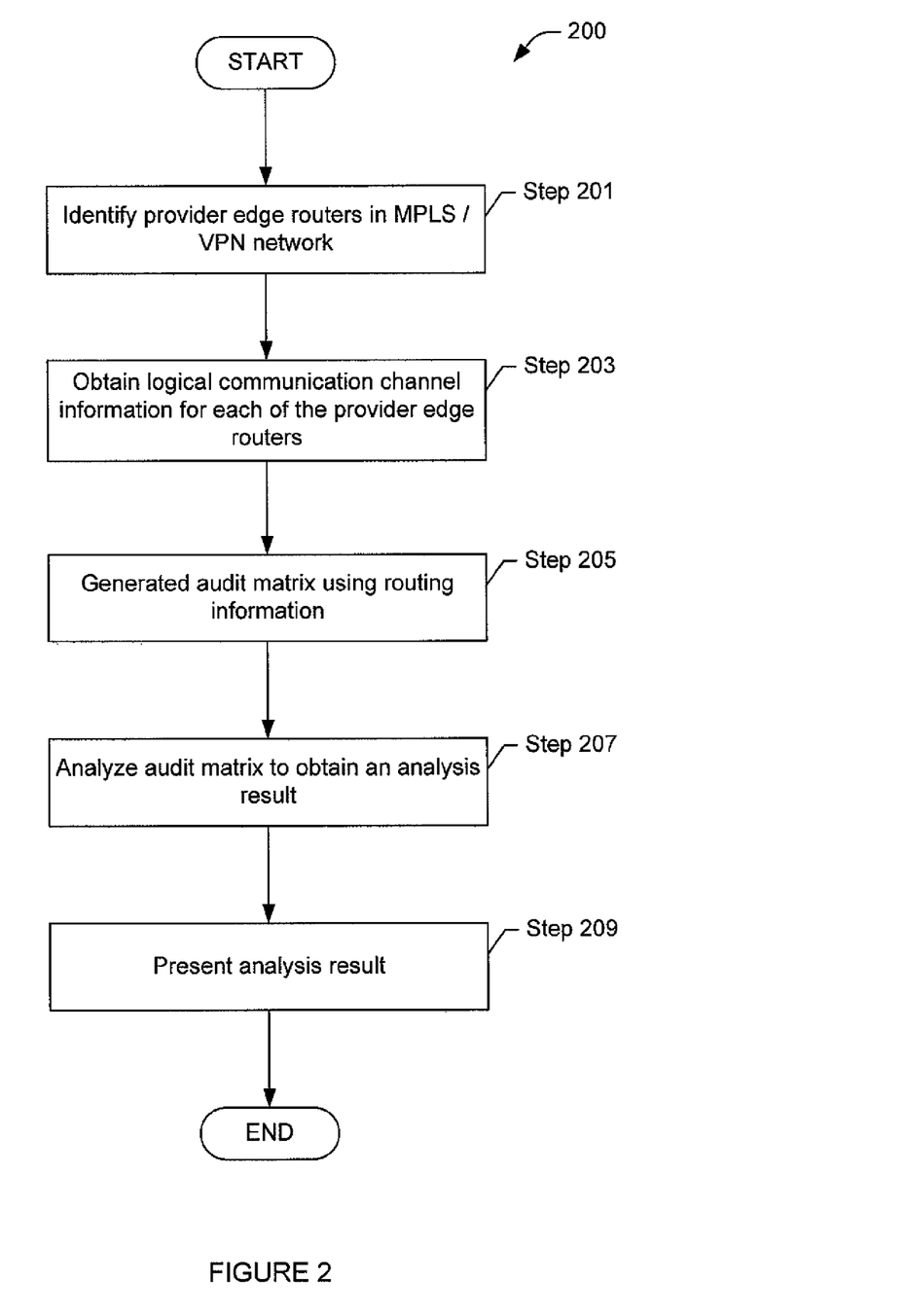
FIGS. 2-4 show flowcharts in accordance with one or more embodiments of the invention.
Figure 3:
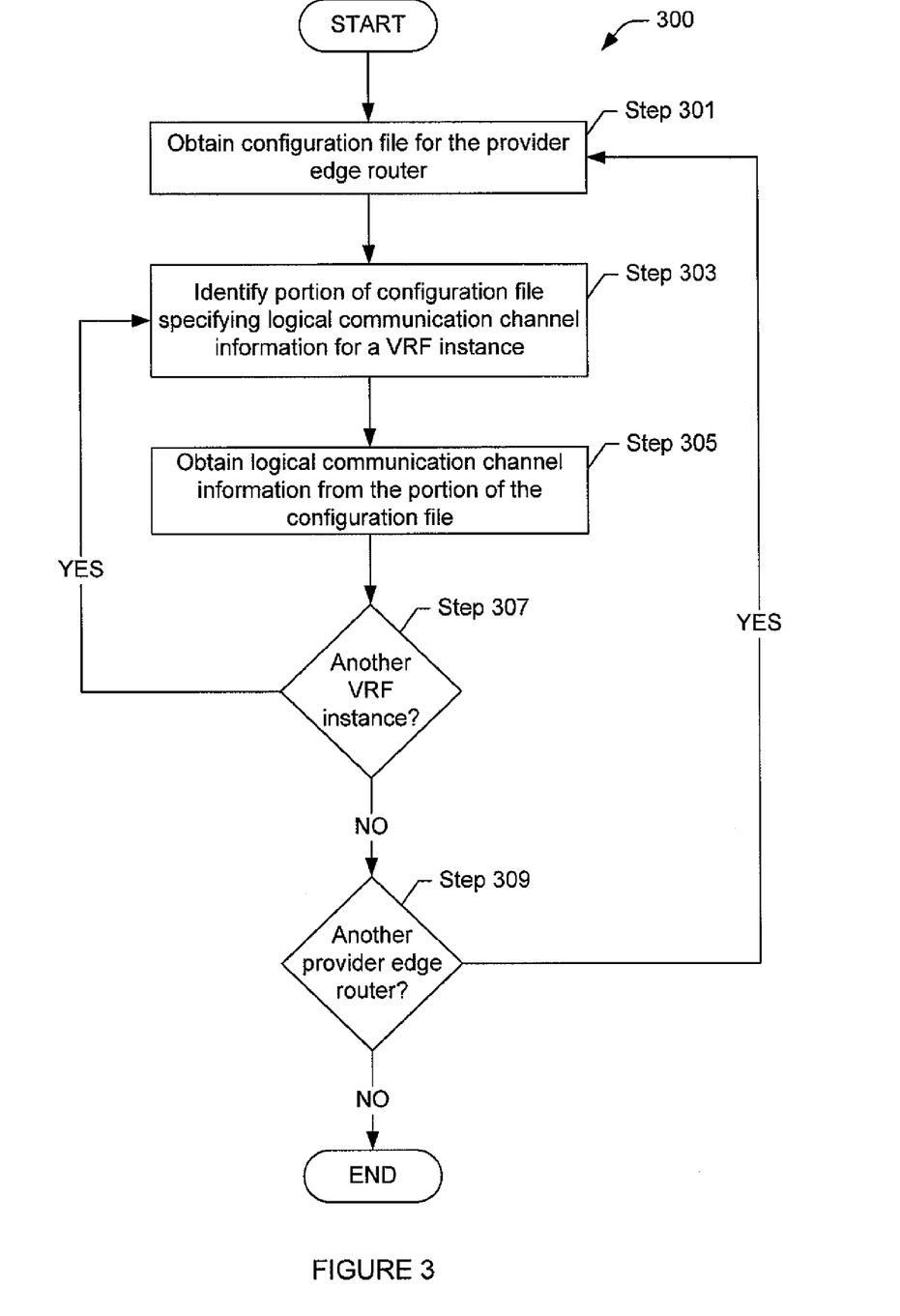
Figure 4:
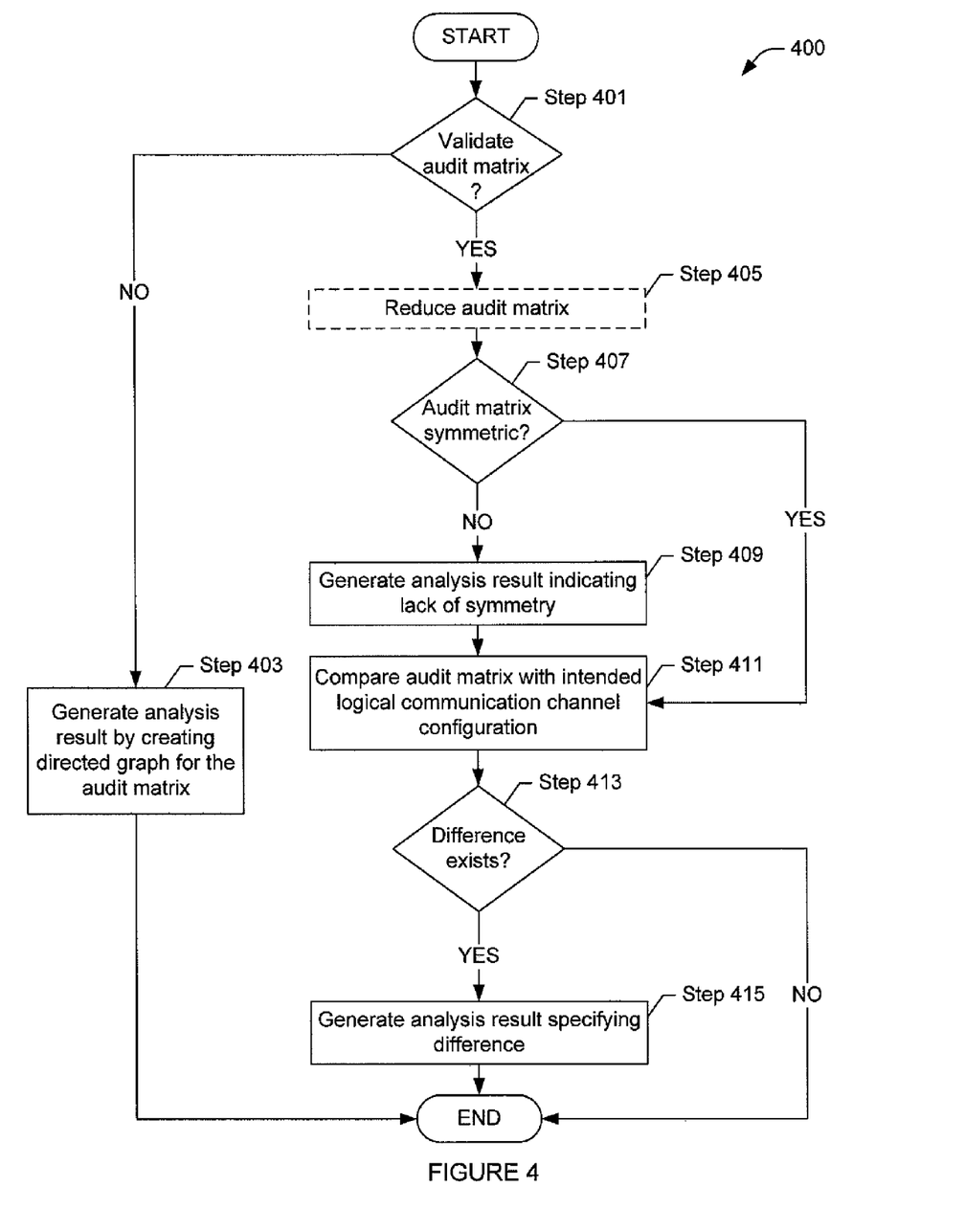

FIGS. 2-4 show flowcharts of methods for analyzing the topology of an MPLS/VPN network in accordance with one or more embodiments of the invention. While the various steps in these flowcharts are presented and described sequentially, one of ordinary skill will appreciate that some or all of the steps may be executed in different orders and some or all of the steps may be executed in parallel.

FIG. 2 shows a flowchart of a method (200) for generating and analyzing an audit matrix in accordance with one or more embodiments of the invention. Initially, provider edge routers in the MPLS/VPN network are identified (Step 201). Several methods may be used to identify the provider edge routers in the MPLS/VPN network. For example, a list of provider edge routers may be maintained by the framework or by another system(s) operatively connected to the framework. In one embodiment of the invention, each time a new provider edge router is deployed or removed from the MPLS/VPN network, information about the provider edge router may be added or removed from the list (or other data structure used to store the aforementioned information). Alternatively, a request may be broadcasted to all provider edge routers to request that the provider edge routers identify themselves.

Regardless of how the provider edge routers are identified, logical communication channel information is obtained from each of the provider edge routers (Step 203). FIG. 3 shows a flowchart of a method (300) for obtaining logical communication channel information in accordance with one or more embodiments of the invention. As shown in FIG. 3, in order to obtain logical communication channel information, the configuration file for the provider edge router is obtained (Step 301). A copy of the configuration file may be stored on the framework or the configuration file may be obtained from the provider edge router.

From the configuration file, the portion of the configuration file specifying logical communication channel information for a VRF instance is identified (Step 303). In one or more embodiments of the invention, the configuration file uses keywords or tags that demarcate the logical communication channel information for the VRF instances. By parsing the configuration file for the keywords or tags, the portion of the configuration file that includes the logical communication channel information for the VRF instance may be identified.

Accordingly, the logical communication channel information may be obtained from the portion of the configuration file (Step 305). In one or more embodiments of the invention, the logical communication channel information defines, for the particular VRF, the VRF instances to which frames may be sent and the VRF instances from which frames may be received. Obtaining the logical communication channel information may be performed by identifying the keywords or tags used to specify a VRF instance from which or to which frames may be received or sent. Thus, the portion of the configuration file may be parsed for the keywords or tags.

Further, a determination is made whether another VRF instance exists on the provider edge router (Step 307). Specifically, a determination may be made whether the configuration file has logical communication channel information for another VRF instance. If the configuration file has logical communication channel information for another VRF instance, the portion of the configuration specifying the logical communication channel information may be identified and obtained from the configuration file. In this manner, Steps 303-307 are repeated until logical communication channel information for all VRF instances on a particular edge router is identified and extracted from the configuration file.

Once logical communication channel information for all VRF instances on a particular edge router is identified and extracted from the configuration file, a determination is made about whether another provider edge router exists (Step 309). If another provider edge router exists, then Steps 301-309 are repeated to obtain logical communication channel information for the next provider edge router.

Returning to FIG. 2, during or after obtaining logical communication channel information, an audit matrix may be generated using the logical communication channel information (Step 205). Generating the audit matrix may be based on how the audit matrix is maintained in a data structure. In one embodiment of the invention, when a VRF instance allows routing information (e.g., which customer edges are connected to the VRF instance) to be sent to another VRF instance, a value in the appropriate entry is set to indicate the presence of a logical communication channel (uni-directional or bi-directional, depending on the encoding scheme).

In one or more embodiments of the invention, the audit matrix is analyzed to obtain an analysis result (Step 207).

FIG. 4 shows a flowchart of a method (400) for analyzing the audit matrix to obtain an analysis result in accordance with one or more embodiments of the invention. As shown in FIG. 4, a determination may be made whether to validate the audit matrix (Step 401). If a determination is made not to validate the audit matrix, an analysis result is generated by creating a directed graph of the audit matrix (Step 403). Each edge in the directed graph specifies the direction between two VRF instances that the routing information may be sent. For example, the directed graph may be used to show whether the communication channel is uni-directional or bi-directional.

Alternatively, if a determination is made to validate the audit matrix, then the audit matrix is optionally reduced (Step 405). Reducing the audit matrix may be performed by swapping rows and columns. The reduction may be performed to identify subsets of VRF instances that are completely connected and subsets of VRF instances that are disjoint from other VRF instances. For example, by swapping rows and column to move the rows and columns of connected VRF instances next to each other in the audit matrix, the audit matrix may be more easily viewed and analyzed. Reducing the audit matrix may be performed by using various well-known techniques in linear algebra.

Continuing with FIG. 4, once the audit matrix is reduced, a determination is made about whether the audit matrix is symmetric (Step 407). In one embodiment of the invention, if the entry at position (i, j) equals the entry at position (j, i), for each value of i and j, then the audit matrix may be determined to be symmetric. In another example, if the audit matrix is maintained in list format, then the audit matrix is symmetric if VRF instance i is in the list of VRF instance j and VRF instance j is in the list of VRF instance i.

If the audit matrix is not symmetric, then the analysis result indicates the lack of symmetry (Step 409). The analysis result may also include information identifying the logical communication channel(s) that are uni-directional and/or VRF instance(s) that are not connected, via a logical communication channel (uni-directional or bi-directional) to any other VRF instances. The analysis result may also specify the particular configuration file(s) to update and the portion of the configuration file(s) to update.

Continuing with FIG. 4, the audit matrix may also be compared with an intended logical communication channel configuration (Step 411). For example, the audit matrix may be compared with a matrix representing the intended communication channels (hereafter referred to as the "intended matrix"). If the intended matrix is in the same form as the audit matrix, then comparing the audit matrix may be performed by determining whether each entry in the intended matrix is the same as the corresponding entry in the audit matrix. Any entry that is not the same represents a difference between the audit matrix and the intended matrix.

Alternatively, the intended communication channel configuration may be a list of rules that any audit matrix or that a subset of audit matrices should comply within the MPLS/VPN network. For example, the list of rules may include a rule that routing information for a VPN should only be sent within the VPN. Specifically, the rule may specify that the VPN should not be exposed to another VPN. In such scenario, the entries in the audit matrix corresponding to VRF instances in the VPN may be checked to determine that the VRF instances do not allow communication to/from other VRF instances outside of the VPN.

Continuing with FIG. 4, if a difference exists between the audit matrix and the intended communication channel configuration (Step 413), then the analysis result may be generated to specify the difference (Step 415). For example, the analysis result may identify the position of the error in the audit matrix, specify that the configuration file(s) that should be updated, etc.

One skilled in the art will appreciate that at any stage during the generation of the analysis result, if the analysis result is already generated, then the analysis result may be amended and/or otherwise modified to include additional analysis results. Further, while not shown in FIG. 4, current and historical audit matrices may be analyzed to determine the evolution of the topology of the MPLS/VPN network. By analyzing the current and historical audit matrices, a determination may be made, for example, about the evolution of the connections between VRF instances and/or the presence or absence of given VRF instances.

In one embodiment of the invention, in addition to the information generated in Steps 409 and 415, the analysis result may also include the audit matrix.

Returning to FIG. 2, the analysis result is presented (Step 209). Multiple mechanisms exist to present the analysis result without departing from the scope of the invention. For example, the analysis result may be displayed on a printout and/or on a monitor. For example, if the analysis result is a directed graph, then the directed graph may be displayed on a screen. In example, the analysis result includes a recommendation to change a portion of a configuration file. In such scenarios, the analysis result may be presented to a network administrator in an e-mail. Further, if a third party is analyzing the topology of the MPLS/VPN network, then the third party may present the analysis result to, for example, the company owning the MPLS/VPN network or the company contracting with the third party.

In one embodiment of the invention, the analysis result include a modified configuration file, where the modified configuration file updates one or more VRF instances to address the lack of symmetry and/or difference between the audit matrix and the intended logical communication channel configuration. In such cases, presenting the analysis result may include sending the analysis result to the provider edge router. Upon receipt, the provider edge router may replace the existing configuration file with the modified configuration file.

If the analysis result is used to change a configuration file, then after the configuration file is changed, the provider edge router uses the new configuration of the VRF instances. Accordingly, the provider edge router enforces the new logical communication channels specified by the VRF instances. Thus, even though a frame may have been blocked from being sent to a customer edge because the VRF instance previously did enable the necessary logical communication channel, the frame may be sent to the customer edge once the modified configuration file is updated. Conversely, a frame that was previously allowed to be sent to a customer edge may now be blocked from being sent to a customer edge because the VRF instance disabled a logical communication channel after receiving the modified configuration file. Those skilled in the art will appreciate that instead of sending a modified configuration file to the provider edge router, instructions about how to modify the configuration file may be sent to the provider edge router. In such cases, the provider edge router includes functionality to update the configuration file using the aforementioned instructions.

In one embodiment of the invention, presenting the analysis result may include storing the audit matrix in memory (e.g., Random Access Memory, etc.) or persistent storage. For example, the analysis result may be stored in persistent storage and be used, for example, to identify the evolution of the MPLS/VPN network.

Figure 5:
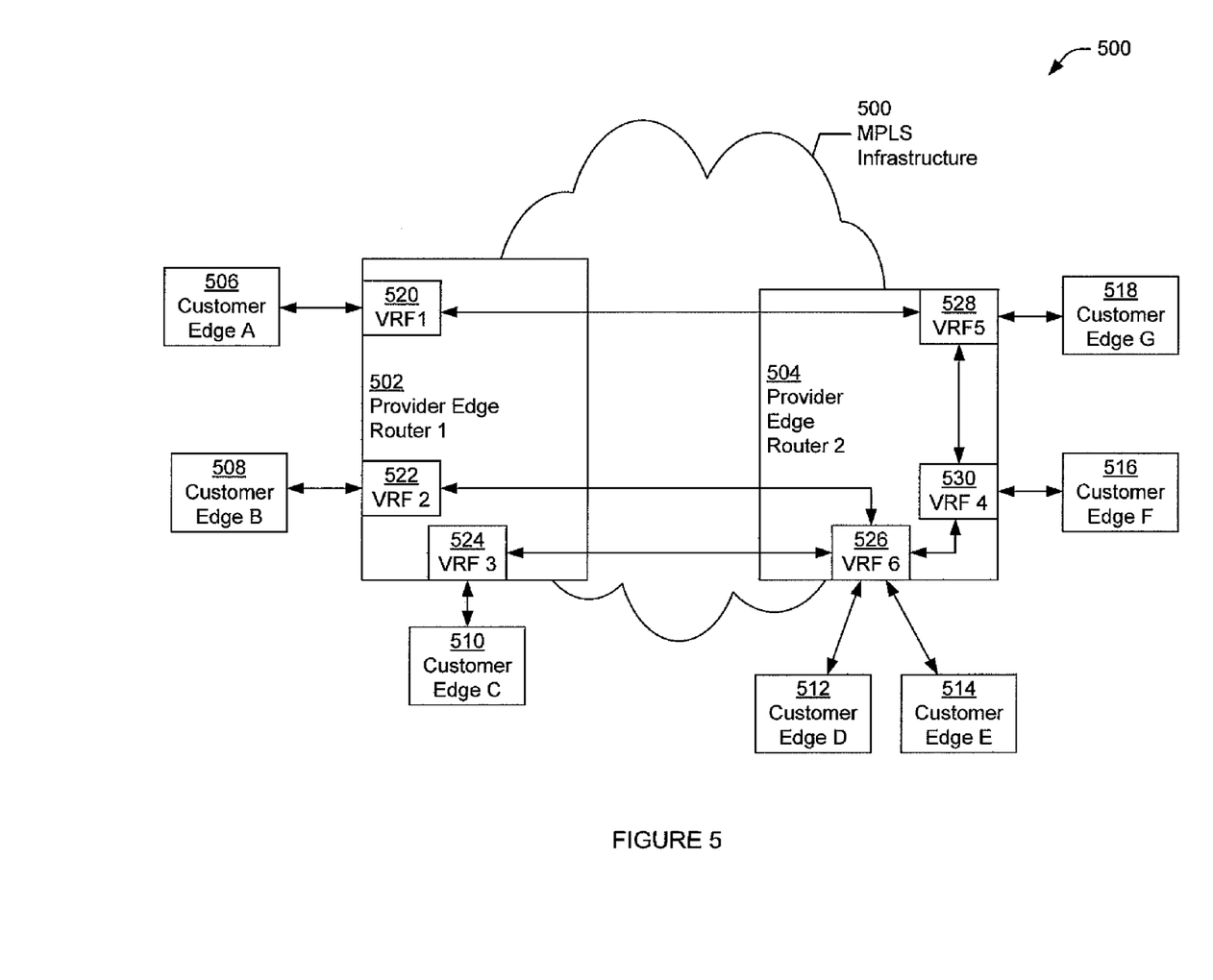
FIG. 5 shows an example MPLS network in accordance with one or more embodiments of the invention.

The following example is used to illustrate one or more embodiments of the invention. The example is not intended to limit the scope of the invention. Turning to the example, FIG. 5 shows an example MPLS/VPN network (500) in accordance with one or more embodiments of the invention. In the example, consider the scenario in which organization alpha (not shown) has a VPN that includes customer edge A (506) and customer edge G (518), respectively. Organization beta (not shown) has a VPN that includes customer edge B (508), customer edge C (510), customer edge D (512), customer edge E (514), and customer edge F (516), respectively.

Further, organization alpha intends to allow only communication between VRFs (i.e., VRF 1 (520) and VRF 5 (528)) within its VPN. Similarly, organization beta intends to allow only communication between VRFs within its VPN. In FIG. 5, the currently deployed logical communication channels are represented by the lines connecting the VRF instances to each other.

The topology of the MPLS/VPN/network is subsequently analyzed in accordance with one or more embodiments of the invention. In particular, the configuration file for provider edge router 1 (502) and provider edge router 2 (504) are obtained. By parsing the configuration files, the framework (not shown) is able to obtain logical communication channel information for each VRF instance (e.g., VRF 1 (520) VRF 2 (522), VRF 5 (524), VRF 4 (530), VRF 5 (528), VRF 6 (526)). Based on the logical communication channel information, the framework may construct the following matrix:

$$\begin{pmatrix} 1 & 0 & 0 & 0 & 1 & 0 \\ 0 & 1 & 0 & 0 & 0 & 1 \\ 0 & 0 & 1 & 0 & 0 & 1 \\ 0 & 0 & 0 & 1 & 1 & 1 \\ 1 & 0 & 0 & 1 & 1 & 0 \\ 0 & 1 & 1 & 1 & 0 & 1 \end{pmatrix}$$

In the above matrix, the first row/column represents VRF 1 (520) communication channels, the second row/column represents VRF 2 (522) communication channel, etc. Next, the framework can reduce the matrix by permutations of the rows and columns. Specifically, the first row and first column is for VRF 1 (520), the second row and second column is for VRF 5 (528), the third row and third column is for VRF 6 (526), the fourth row and fourth column is for VRF 2 (522), the fifth row and fifth column is for VRF 3 (524), and the sixth row and sixth column is for VRF 4 (530). Accordingly, the following matrix may be created:

$$\begin{pmatrix} 1 & 1 & 0 & 0 & 0 & 0 \\ 1 & 1 & 0 & 0 & 0 & 1 \\ 0 & 0 & 1 & 1 & 1 & 1 \\ 0 & 0 & 1 & 1 & 0 & 0 \\ 0 & 0 & 1 & 0 & 1 & 0 \\ 0 & 1 & 1 & 0 & 0 & 1 \end{pmatrix}$$

By analyzing the above audit matrix, an analysis report may be generated to reflect that all VRF instances are connected. Specifically, the audit matrix shows that the VPN of organization alpha is connected to the VPN of organization beta. In particular, organization alpha has a logical communication channel with organization beta through VRF 4 (530) and VRF 5 (528). Further, the audit matrix may also include the information organization alpha has a fully meshed topology (i.e., fully connected) of a network and organization beta has a single hub and spoke network.

Based on the analysis result, the MPLS/VPN network may be reconfigured to remove the logical communication channel between organization alpha and organization beta (i.e., remove the logical communication channel between VRF 4 (530) and VRF 5(428)). Further, logical communication channels may be created for organization beta to ensure that if VRF instance 6 (526) is lost, the VPN for organization beta may remain active.

Figure 6:
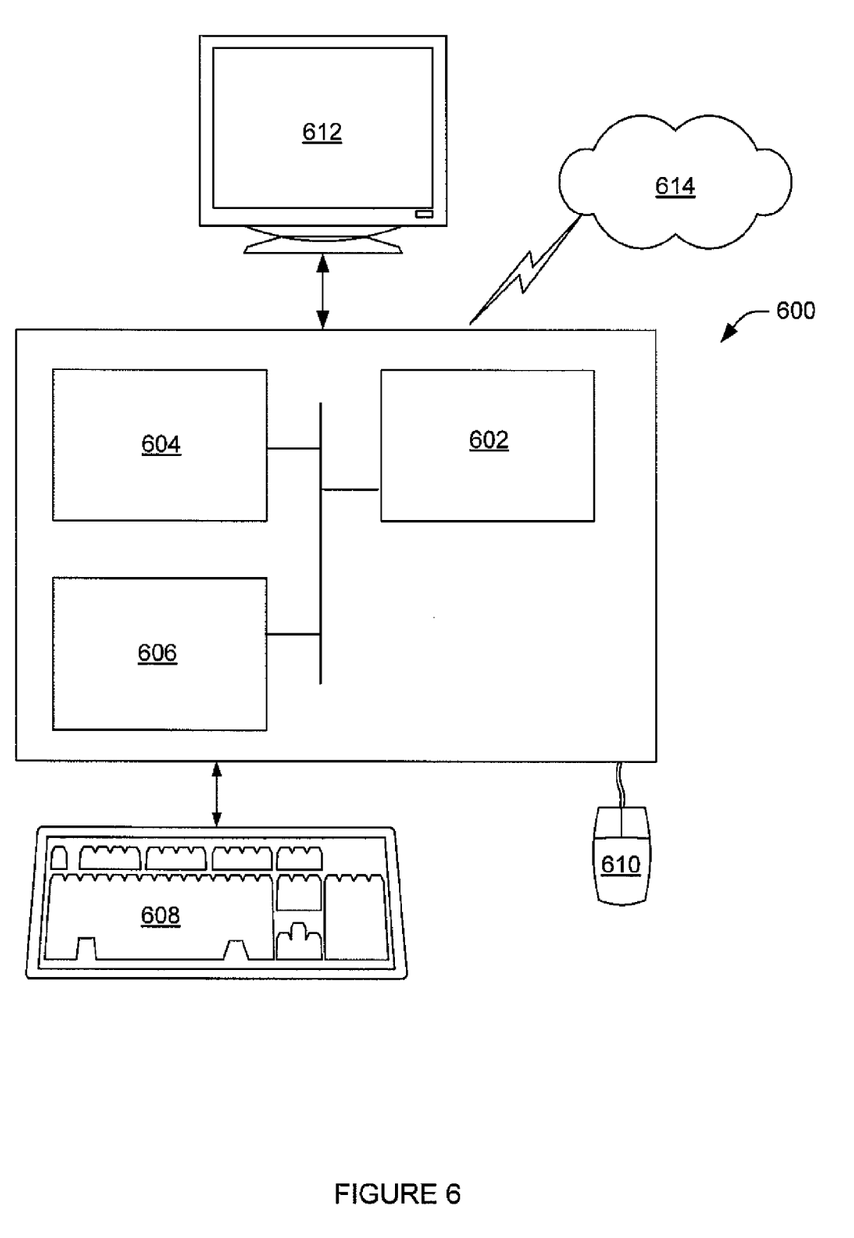
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (614) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., audit matrix, analysis engine) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a topology of a multiprotocol label switching (MPLS)/Virtual Private Network (VPN) network comprising:
    obtaining logical communication channel information for a plurality of virtual routing and forwarding (VRF) instances, wherein each of the plurality of VRF instances are located on one of a plurality of routers, wherein the logical communication channel information specifies a plurality of logical communication channels between the plurality of VRF instances, and wherein at least two VRF instances are located on one of the plurality of routers;
    constructing, by a computer processor, an audit matrix representing the logical communication channel information, wherein the audit matrix specifies the topology of the MPLS/VPN network, wherein the audit matrix comprises a separate row for each of the plurality of VRF instances and a separate column for each of the plurality of VRF instances, and wherein constructing the audit matrix comprises:
for each of the plurality of logical communication channels in the logical channel information:
identifying two VRF instances of the plurality of VRF instances that can communicate via the logical communication channel,
identifying at least one entry located at the separate row and the separate column for the two VRF instances in the audit matrix, and
setting a value of the at least one entry, wherein the value specifies the logical communication channel between the two VRF instances;
analyzing, by the computer processor, the audit matrix according to the value set for each of the plurality of logical communication channels to obtain an analysis result, wherein analyzing the audit matrix comprises:
comparing the audit matrix with an intended matrix, wherein the intended matrix identifies an intended configuration of communication channels between the plurality of VRF instances,
reducing the audit matrix by swapping at least one row and at least one column of the audit matrix to obtain a reduced audit matrix,
identifying a plurality of disjoint subsets of the plurality of VRF instances from the reduced audit matrix, and
creating the analysis result, wherein the analysis result specifies a difference between the audit matrix and the intended matrix and comprises the plurality of disjoint subsets; and
presenting the analysis result.

2. The method of claim 1, further comprising:
re-configuring at least one router using the analysis result.

3. The method of claim 1, wherein analyzing the audit matrix comprises determining whether each VRF instance of the plurality of VRF instances comprises at least one logical communication channel with a second VRF instance, based on whether all entries in a row and a column associated with the same VRF instance are set to indicate that no communication channel exists.

4. The method of claim 1, wherein the analysis result is presented as a directed graph.

5. The method of claim 1, wherein presenting the analysis result comprises presenting a recommendation to modify at least a portion of the logical channel information based on the analysis result.

6. The method of claim 1, wherein analyzing the audit matrix comprises determining whether the audit matrix is symmetric, wherein the analysis result indicates that each communication channel of the plurality of communication channels is bidirectional when the audit matrix is symmetric.

7. The method of claim 1, wherein each entry in the audit matrix is represented by a single bit.

8. A system for analyzing a topology of a multiprotocol label switching (MPLS)/Virtual Private Network (VPN) network comprising:
a plurality of routers comprising logical channel information; and
a framework configured to:
obtain the logical channel information for a plurality of virtual routing and forwarding (VRF) instances on the plurality of routers, wherein the logical channel information specifies a plurality of logical communication channels between the plurality of VRF instances, and wherein at least two VRF instances are located on the same router;
construct an audit matrix representing the logical channel information, wherein the audit matrix specifies the topology of the MPLS/VPN network, wherein the audit matrix comprises a separate row for each of the plurality of VRF instances and a separate column for each of the plurality of VRF instances, and wherein constructing the audit matrix comprises:
for each of the plurality of logical communication channels in the logical channel information:
identifying two VRF instances of the plurality of VRF instances that can communicate via the logical communication channel,
identifying at least one entry located at the separate row and the separate column for the two VRF instances in the audit matrix, and
setting a value of the at least one entry, wherein the value specifies the logical communication channel between the two VRF instances;
analyze the audit matrix according to the value set for each of the plurality of logical communication channels to obtain an analysis result, wherein analyzing the audit matrix comprises:
comparing the audit matrix with an intended matrix, wherein the intended matrix identifies an intended configuration of communication channels between the plurality of VRF instances,
reducing the audit matrix by swapping at least one row and at least one column of the audit matrix to obtain a reduced audit matrix,
identifying a plurality of disjoint subsets of the plurality of VRF instances from the reduced audit matrix, and
creating the analysis result, wherein the analysis result specifies a difference between the audit matrix and the intended matrix and comprises the plurality of disjoint subsets; and
submit a modification to the logical channel information to modify at least one of the plurality of logical communication channels according to the analysis result.

9. The system of claim 8, wherein submitting the modification comprises re-configuring at least one of the plurality of routers using the modification.

10. The system of claim 8, wherein submitting a modification comprises generating an analysis report comprising the modification.

11. The system of claim 8, wherein analyzing the audit matrix comprises determining whether the audit matrix is symmetric, wherein the analysis result indicates that each communication channel of the plurality of communication channels is bidirectional when the audit matrix is symmetric.

12. A computer readable storage medium comprising computer readable program code embodied therein for causing a computer system to:
obtain logical channel information for a plurality of virtual routing and forwarding (VRF) instances on a plurality of routers, wherein the logical channel information specifies a plurality of logical communication channels between the plurality of VRF instances, and wherein at least two VRF instances are located on the same router;
construct an audit matrix representing the logical channel information, wherein the audit matrix specifies a topology of a MPLS/VPN network, wherein the audit matrix comprises a separate row for each of the plurality of VRF instances and a separate column for each of the plurality of VRF instances, and wherein constructing the audit matrix comprises:

for each of the plurality of logical communication channels in the logical channel information:
  identifying two VRF instances of the plurality of VRF instances that can communicate via the logical communication channel,
  identifying at least one entry located at the separate row and the separate column for the two VRF instances in the audit matrix, and
  setting a value of the at least one entry, wherein the value specifies the logical communication channel between the two VRF instances;
analyze the audit matrix according to the value set for each of the plurality of logical communication channels to obtain an analysis result, wherein analyzing the audit matrix comprises:
  comparing the audit matrix with an intended matrix, wherein the intended matrix identifies an intended configuration of communication channels between the plurality of VRF instances,
  reducing the audit matrix by swapping at least one row and at least one column of the audit matrix to obtain a reduced audit matrix,
  identifying a plurality of disjoint subsets of the plurality of VRF instances from the reduced audit matrix, and
  creating the analysis result, wherein the analysis result specifies a difference between the audit matrix and the intended matrix and comprises the plurality of disjoint subsets; and
submit a modification to the logical channel information to modify at least one of the plurality of logical communication channels according to the analysis result.

13. The computer readable storage medium of claim 12, wherein instructions for submitting the modification comprises instructions for re-configuring at least one of the plurality of routers using the modification.

\* \* \* \* \*